United States Patent [19]

Berecz

[11] Patent Number: 4,681,497
[45] Date of Patent: Jul. 21, 1987

[54] ENCAPSULATED FASTENER

[75] Inventor: Imre Berecz, El Toro, Calif.

[73] Assignee: Microdot Inc., Darien, Conn.

[21] Appl. No.: 739,027

[22] Filed: May 29, 1985

[51] Int. Cl.⁴ ............................ A47G 3/00; B64C 1/12
[52] U.S. Cl. .................................... 411/377; 244/132;
 361/218; 411/296; 411/903; 439/86
[58] Field of Search .............. 411/377, 396, 900, 901,
 411/902, 903, 907, 908; 339/DIG. 3; 361/216,
 217, 218; 244/131, 132

[56] References Cited

U.S. PATENT DOCUMENTS

| 2,349,103 | 5/1944 | Marschner et al. | 244/132 |
| 2,441,087 | 5/1948 | Symer | 244/132 |
| 3,329,851 | 7/1967 | Brautigam et al. | 339/DIG. 3 X |
| 3,755,713 | 8/1973 | Paszkowski | 244/1 A X |
| 3,898,526 | 8/1975 | Hendricks | 361/218 X |
| 3,971,610 | 7/1976 | Buchoff et al. | 339/DIG. 3 X |
| 3,995,092 | 11/1976 | Fuchs | 411/900 X |
| 4,295,699 | 10/1981 | Du Rocher | 339/DIG. 3 X |
| 4,449,774 | 5/1984 | Takashi et al. | 339/DIG. 3 |
| 4,478,544 | 10/1984 | Strand | 411/34 |
| 4,479,163 | 10/1964 | Bannick et al. | 244/1 A X |
| 4,490,083 | 12/1984 | Rebish | 411/902 X |
| 4,502,092 | 2/1985 | Bannick, Jr. | 244/1 A X |
| 4,542,056 | 9/1985 | Anglin et al. | 361/218 X |
| 4,556,591 | 12/1985 | Bannick | 244/1 A X |

FOREIGN PATENT DOCUMENTS

| 790051 | 2/1958 | United Kingdom | 411/377 |
| 544028 | 4/1978 | U.S.S.R. | 339/DIG. 3 |
| 812993 | 3/1981 | U.S.S.R. | 411/908 |

Primary Examiner—Thomas J. Holko
Attorney, Agent, or Firm—Lyman R. Lyon

[57] ABSTRACT

An encapsulated metal bolt comprises a head portion having an encapsulating cap thereon with a plurality of conductive fibers therein electrically isolated from the head but electrically exposed to the surface of a complementary aperture.

1 Claim, 8 Drawing Figures

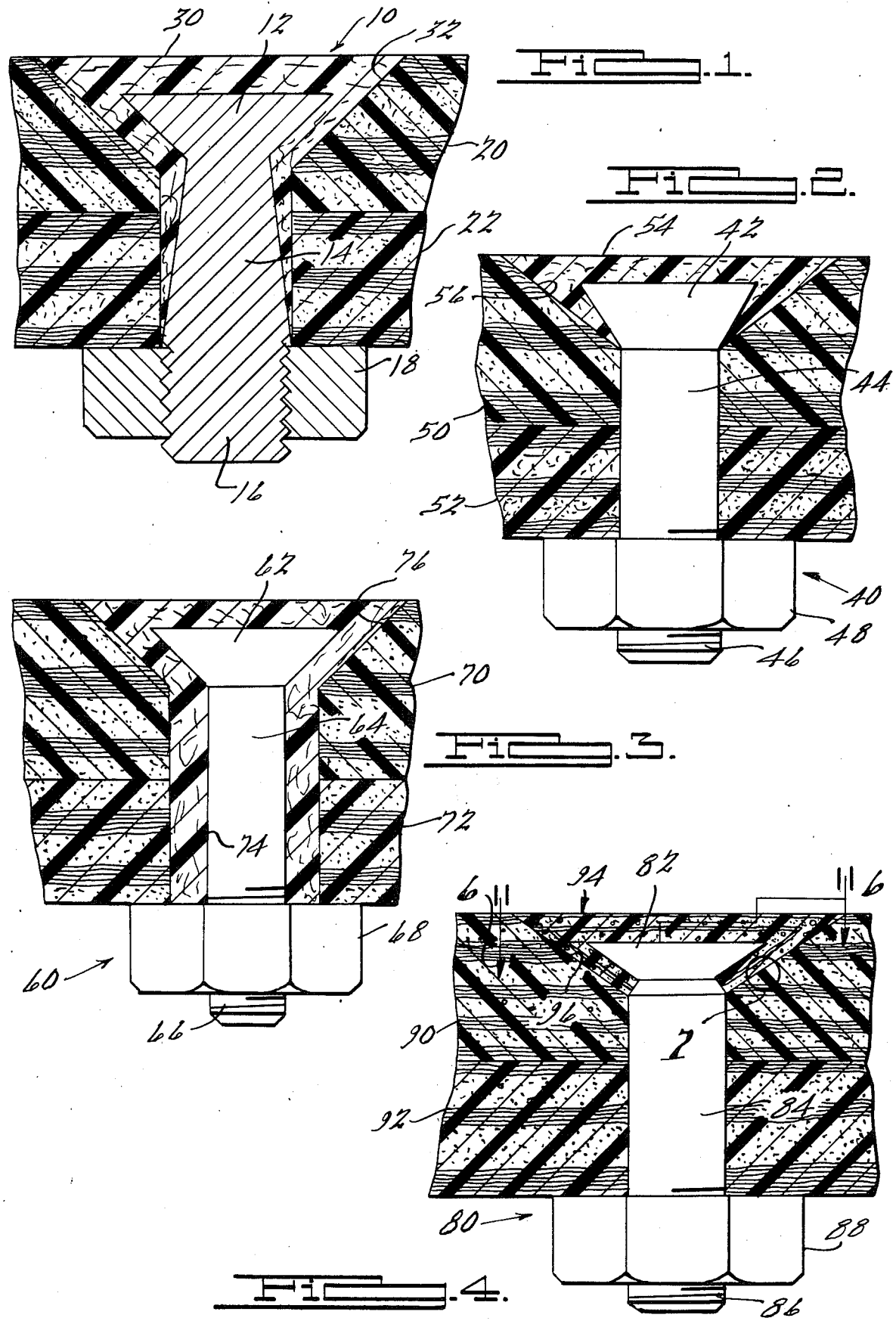

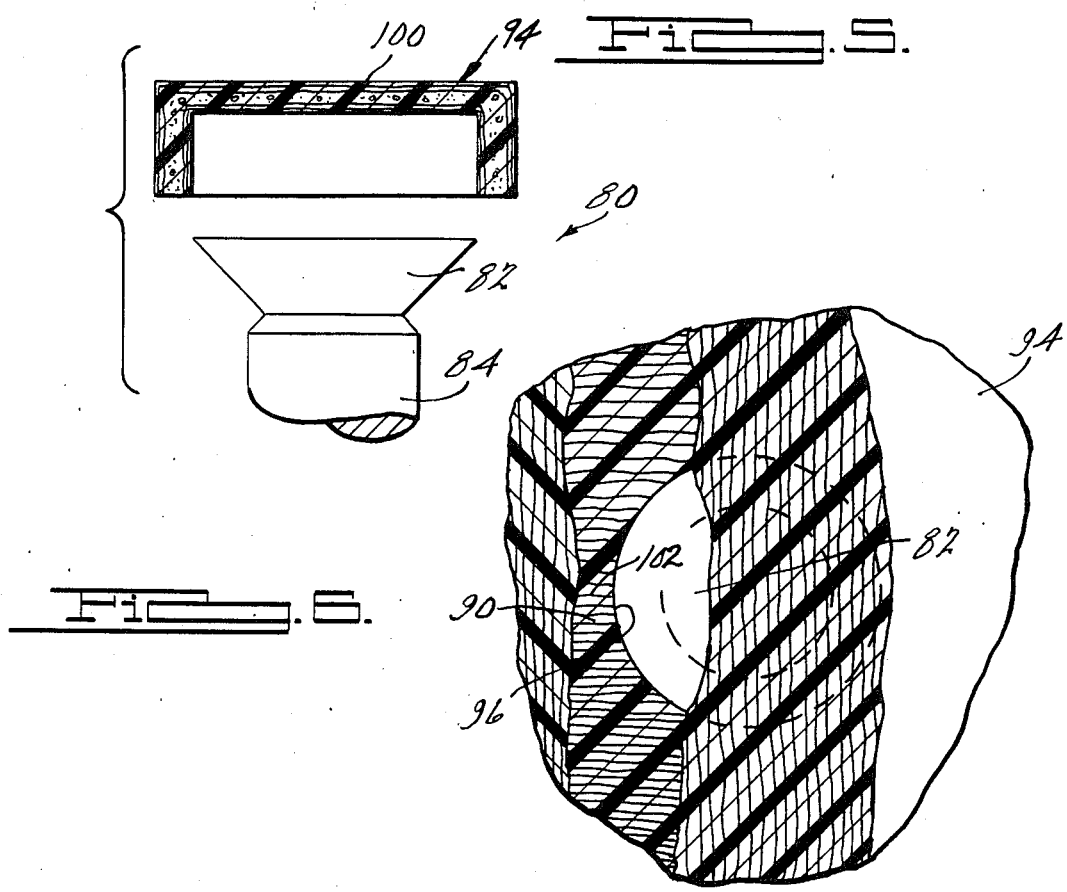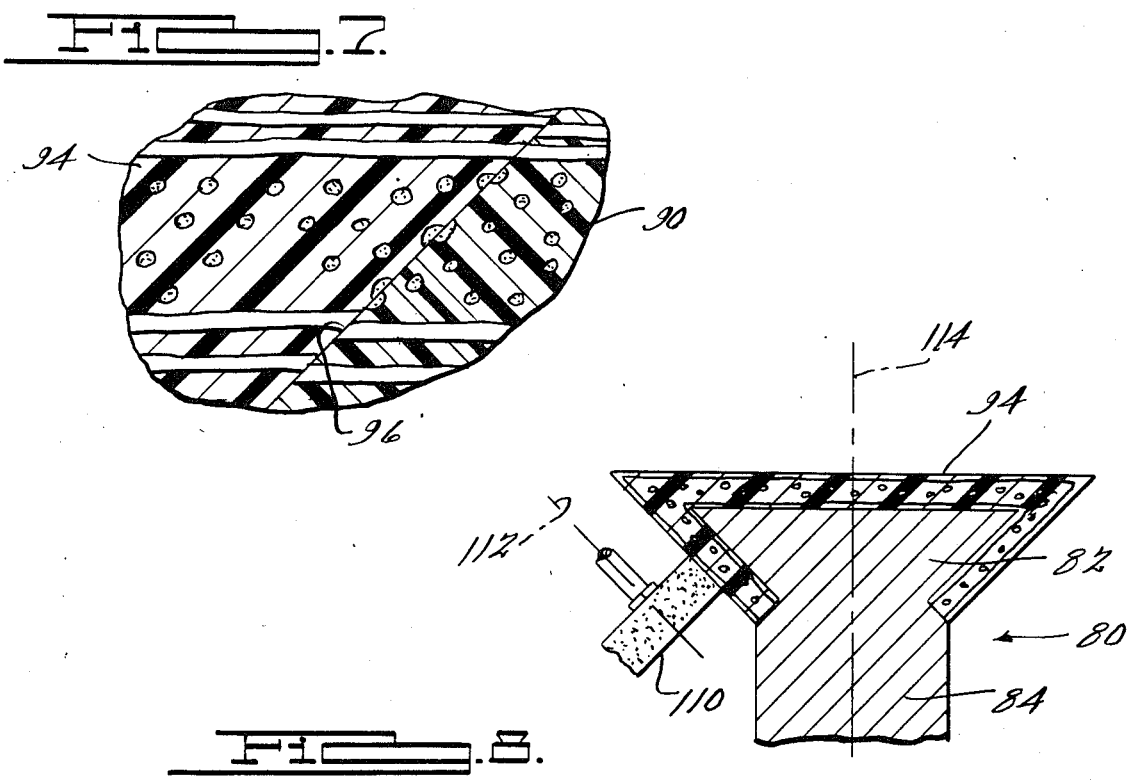

ENCAPSULATED FASTENER

BACKGROUND OF THE INVENTION

Composite materials exhibit a relatively high strength-to-weight ratio that renders them usable for aircraft applications, particularly skin panels. However, since an aircraft is exposed to lightening strikes in flight, precautions must be taken to effectively ground all components of the aircraft relative to one another in order to dissipate the electrical energy of a lightening strike. This has heretofore presented a problem since composite materials generally contain a conductive fiber, for example, carbon fibers that are insulated from one another by a resin matrix. Where the fibers are continuous the electrical energy of the lightening strike is dissipated into the atmosphere. However, when electrical continuity is disrupted, the electrical potential tends to build up, resulting in an arc which, in some cases, can destroy the composite structure of its supportive structural elements.

A specific problem that is addressed by the instant invention is the problem experienced when an electrically conductive bolt, rivet, or the like, is seated in an aperture in a composite material. When lightening strikes the composite material, the electric energy is conducted by the carbon filaments of the composite until a bolt or fastener is reached. Because the bolt is relatively more conductive than the carbon fibers, the electrical energy tends to follow the bolt. However, because the conductive path offered by the bolt is discontinuous, the bolt often melts or the holding power thereof is compromised due to subsequent arcing of the electrical energy.

SUMMARY OF THE INVENTION

The encapsulated bolt of the instant invention addresses the problem of lightening strike by providing for electrical continuity across the head of the bolt while insulating the body of the bolt from the surrounding composite matrix. This is accomplished by encapsulating either the head portion only or the head and shank portions of the bolt with a resin/carbon fiber matrix having electrical characteristics similar to that of the composite material in which the bolt resides. Electrical energy carried by the carbon fibers of the composite skin thus has a path across the head of the bolt to the fibers on the far side of the aperture containing the bolt thus allowing the energy to dissipate across the entire skin of the aircraft as opposed to being directed laterally and terminating in the highly conductive bolt.

BRIEF DESCRIPTION OF THE DRAWINGS

FIG. 1 is a cross-sectional view of an encapsulated bolt in accordance with one embodiment of the instant invention.

FIG. 2 is a view similar to FIG. 1 of a second embodiment of the instant invention.

FIG. 3 is a view similar to FIG. 1 of a third embodiment of the invention.

FIG. 4 is a view of a fourth embodiment of the invention.

FIG. 5 is a view of a composite cap prior to assembly thereof with the metal portion of the encapsulated bolt.

FIG. 6 is a view taken substantially along the line 6—6 of FIG. 4.

FIG. 7 is a view taken within the circle 7 of FIG. 3.

FIG. 8 is a view of a portion of the manufacturing process of the bolt of FIG. 4.

DETAILED DESCRIPTION OF THE PREFERRED EMBODIMENTS OF THE INVENTION

As seen in FIG. 1 of the drawing, an encapsulated bolt 10 in accordance with the present invention comprises a metal head portion 12, a shank portion 14 and a threaded portion 16 for the acceptance of a conventional nut 18. The bolt 10 is utilized to fasten two sheets of composite material 20 and 22 to one another.

The bolt 10 is provided with a composite cap 30 comprising chopped conductive fibers, for example carbon fibers, embedded in a resin matrix. It has been found that density of the carbon fibers to the resin of 70% by weight results in adequate conductivity across the head of the bolt. Because each of the carbon fibers is surrounded by resin, insulation is provided from the metal portions 12 and 14 of the bolt 10. However, because the outermost fibers of the bolt 10 are in direct contact with a machined or reamed conical bore 32 in the composite sheet 20, electrical continuity is provided across the composite sheet 20.

As seen in FIG. 2 of the drawing, an encapsulated bolt 40, in accordance with another embodiment of the present invention, comprises a truncated conical metal head portion 42, a cylindrical shank portion 44 and a threaded end portion 46 for the acceptance of a conventional nut 48. The bolt 40 is utilized to fasten two sheets of composite material 50 and 52 to one another. The bolt 40 is provided with composite cap 54 comprising chopped conductive fibers, for example carbon fibers, embedded in a resin matrix. As in the bolt 10, a density of 70% by weight of the carbon fibers results in conductivity across the head of the bolt 40, roughly equivalent to that of the surrounding composite material. Because each of the carbon fibers is surrounded by resin, insulation is provided between the cap 54 and the metal head portion 42 of the bolt 40. However, because the outermost fibers of the cap portion 54 are in direct contact with a machined or reamed concial bore 56 in the composite sheet 50, electrical continuity is provided across the aperture 56 in the composite sheet 50.

As seen in FIG. 3 of the drawings, an encapsulated bolt 60 in accordance with the present invention comprises a truncated concical metal head portion 62, a cylindrical shank portion 64 and a threaded end portion 66 for the acceptance of a conventional nut 68. The bolt 60 is utilized to fasten two sheets of composite material 70 and 72 to one another.

The head 62 and shank 64 of the bolt 60 is provided with a composite sheath 74 comprising chopped conductive fibers, for example carbon fibers, embedded in a resin matrix. The density of the carbon fibers in the resin should be at least 70% by weight. Because each of the carbon fibers is surrounded by resin, insulation is provided between the fibers and the metal portions 62 and 64 of the bolt 60. However, because the outermost fibers of the bolt 60 are abraided and are in direct contact with a machined or reamed conical bore 76 in the composite sheet 70, electrical continuity is provided across the composite sheet 70.

As seen in FIG. 4 of the drawings, an encapsulated bolt 80 in accordance with yet another embodiment of the present invention comprises a truncated conical metal head portion 82, a shank portion 84 and a threaded portion 86 for the acceptance of a conventional nut 88. The bolt 80 is utilized to fasten two sheets of composite material 90 and 92 to one another.

The bolt 80 is provided with a composite cap 94 comprising sandwiched layers of parallel conductive fibers, for example carbon fibers, embedded in a resin matrix. The density of the carbon fibers in the resin is not as critical as in the aforesaid embodiments of the invention. Because each of the carbon fibers is surrounded by resin, insulation is provided between the cap 94 and the metal head 82 of the bolt 80. However, because the outermost fibers of the cap 94 are abraided and are in direct contact with a machined or reamed concial bore 96 in the composite sheet 90, electrical continuity is provided across the composite sheet 90.

As seen in FIG. 5 of the drawings, the cap 94 comprises composite preform 100 in the form of a cup of composite material for the acceptance of the head portion 82 of the bolt 80. The cup 100 is molded about the bolt head 82 to form the cap 94 discussed hereinbefore which is therafter ground, machined or otherwise abraided to remove resin from the outermost carbon fibers to facilitate the necessary electrical contact with the complementary aperture 96.

As seen in FIG. 6 of the drawings, continuity of the carbon fibers 102 in the uppermost composite layer 90 is interrupted by the chamfered bolt hole 96 drilled therethrough. However, since the cap 94 on the bolt 80 effectively bridges the interrupted carbon fibers, electrical continuity is maintained across the skin of the composite layer 90.

FIG. 7 illustrates the electrical engagement between carbon fibers of the encapsulating cap portion 94 of the bolt 80 and the surrounding bolt hole 96 in the composite layer 90. The fibers of the encapsulated bolt 80 are exposed or, in other words, the resin surrounding the fibers is removed by grinding, abraiding, etc., while the resin surrounding the carbon fibers 102 in the composite layer 90 is removed incident to drilling of the hole 96.

FIG. 8 illustrates one method of abraiding the outermost surface of the encapsulating cap 94 of the bolt 80 in order to expose the electrically conductive reinforcing fibers thereof. A grinding wheel 110 is rotated about an axis 112 thereof while the bolt 80 is rotated about its axis 114.

While the preferred embodiment of the invention has been disclosed, it should be appreciated that the invention is susceptible of modification without departing from the scope of the following claims.

I claim:

1. An encapsulated fastener for introduction through an aperture in a workpiece having conductive fibers therein, said fastener comprising a metal bolt having a head portion at one end, a threaded portion at the other end, and a shank between said head and end portions, and a plastic cap encapsulating the head portion of said bolt having a plurality of resin encapsulated electrically conductive fibers therein, said electrically conductive fibers being substantially electrically isolated from said metal bolt by the plastic resin of said cap, the radially outer periphery of said plastic cap being abraided to enhance electrical connection between the conductive fibers thereof and the conductive fibers of said workpiece intersecting the periphery of the aperture in said workpiece whereby electrical continuity is provided by the cap on said bolt across the aperture in said workpiece.

* * * * *